United States Patent
Hashimoto et al.

(10) Patent No.: US 9,127,693 B2
(45) Date of Patent: Sep. 8, 2015

(54) GAS TURBINE, LOAD COUPLING OF GAS TURBINE, AND COOLING METHOD OF GAS TURBINE COMPRESSOR

(75) Inventors: Shinya Hashimoto, Hyogo-ken (JP); Kenichi Arase, Hyogo-ken (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1246 days.

(21) Appl. No.: 12/918,606

(22) PCT Filed: Jan. 8, 2009

(86) PCT No.: PCT/JP2009/050135
§ 371 (c)(1),
(2), (4) Date: Aug. 20, 2010

(87) PCT Pub. No.: WO2009/119127
PCT Pub. Date: Oct. 1, 2009

(65) Prior Publication Data
US 2010/0326088 A1    Dec. 30, 2010

(30) Foreign Application Priority Data

Mar. 28, 2008  (JP) ................................ 2008-088751

(51) Int. Cl.
*F02C 6/08*  (2006.01)
*F04D 29/58*  (2006.01)
(Continued)

(52) U.S. Cl.
CPC .............. *F04D 29/584* (2013.01); *F01D 5/082* (2013.01); *F01D 11/001* (2013.01); *F02C 6/08* (2013.01); *F02C 7/185* (2013.01); *F04D 29/053* (2013.01); *F05D 2240/56* (2013.01)

(58) Field of Classification Search
CPC ......... F01D 5/082; F01D 11/001; F01D 5/08; F01D 5/081; F01D 5/084; F01D 5/085; F01D 5/087; F01D 5/088; F01D 25/08; F01D 25/12; F02C 6/08; F02C 7/185; F02C 3/06; F02C 3/062; F02C 3/064; F02C 7/12; F02C 7/28; F02C 9/18; F04D 29/053; F04D 29/584; F05D 2240/56; F05D 2260/20; F05D 2260/201
USPC ................ 60/785, 795, 782; 415/115, 1, 180; 416/96 R, 97 R, 1, 95
See application file for complete search history.

(56) References Cited

U.S. PATENT DOCUMENTS 5,226,785 A   7/1993 Narayana et al.
5,685,158 A   11/1997 Lenahan et al.
(Continued)

FOREIGN PATENT DOCUMENTS

JP   55156216 A   12/1980
JP   59-194002 A   11/1984
(Continued)

OTHER PUBLICATIONS

Decision of a Patent Grant for corresponding JP2008-088751 mailed Jan. 17, 2012.
(Continued)

*Primary Examiner* — Devon Kramer
*Assistant Examiner* — Vikansha Dwivedi
(74) *Attorney, Agent, or Firm* — Lowe Hauptman & Ham, LLP

(57) ABSTRACT

To include a cooling passage leading from a latter stage of a compressor, via an external cooler, to a hollow part provided in a load coupling that couples a rotor of the compressor and a rotor of a turbine to each other, and also leading from the hollow part to the latter stage of the compressor, and a centrifugal compressor that raises air pressure in the hollow part with rotation of the load coupling, in the hollow part. Therefore, pressure of the air in the hollow part is raised by the centrifugal compressor by using a centrifugal force resulting from the rotation of the load coupling at the time of operating the gas turbine. Cooled air flows from the hollow part to between compressor rotor blades and compressor vanes at the latter stage, and then flows into the hollow part, thereby enabling to efficiently reduce temperature in the hollow part.

6 Claims, 3 Drawing Sheets

(51) Int. Cl.
*F01D 5/08* (2006.01)
*F01D 11/00* (2006.01)
*F02C 7/18* (2006.01)
*F04D 29/053* (2006.01)

(56) References Cited

U.S. PATENT DOCUMENTS

| | | | |
|---|---|---|---|
| 6,089,010 A * | 7/2000 | Gross | 60/782 |
| 6,910,852 B2 | 6/2005 | Simeone et al. | |
| 7,766,607 B2 | 8/2010 | Charier et al. | |
| 2004/0112064 A1* | 6/2004 | Friedl et al. | 60/806 |
| 2010/0011779 A1* | 1/2010 | Senior | 60/785 |

FOREIGN PATENT DOCUMENTS

| | | |
|---|---|---|
| JP | 8-177526 A | 7/1996 |
| JP | 09-004467 A | 1/1997 |
| JP | 11-125199 A | 5/1999 |
| JP | 200583375 A | 3/2005 |
| JP | 2007113586 A | 5/2007 |

OTHER PUBLICATIONS

ISR for PCT/JP2009/050135 mailed Feb. 3, 2009.

* cited by examiner

AXIAL DIRECTION

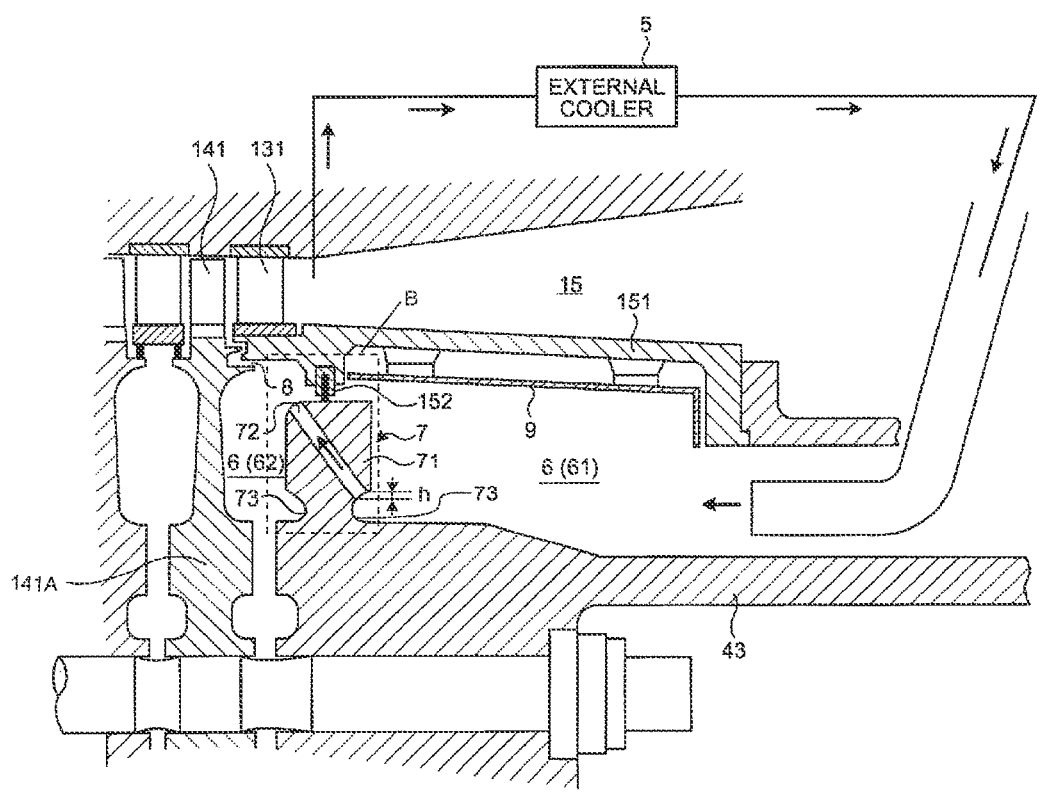

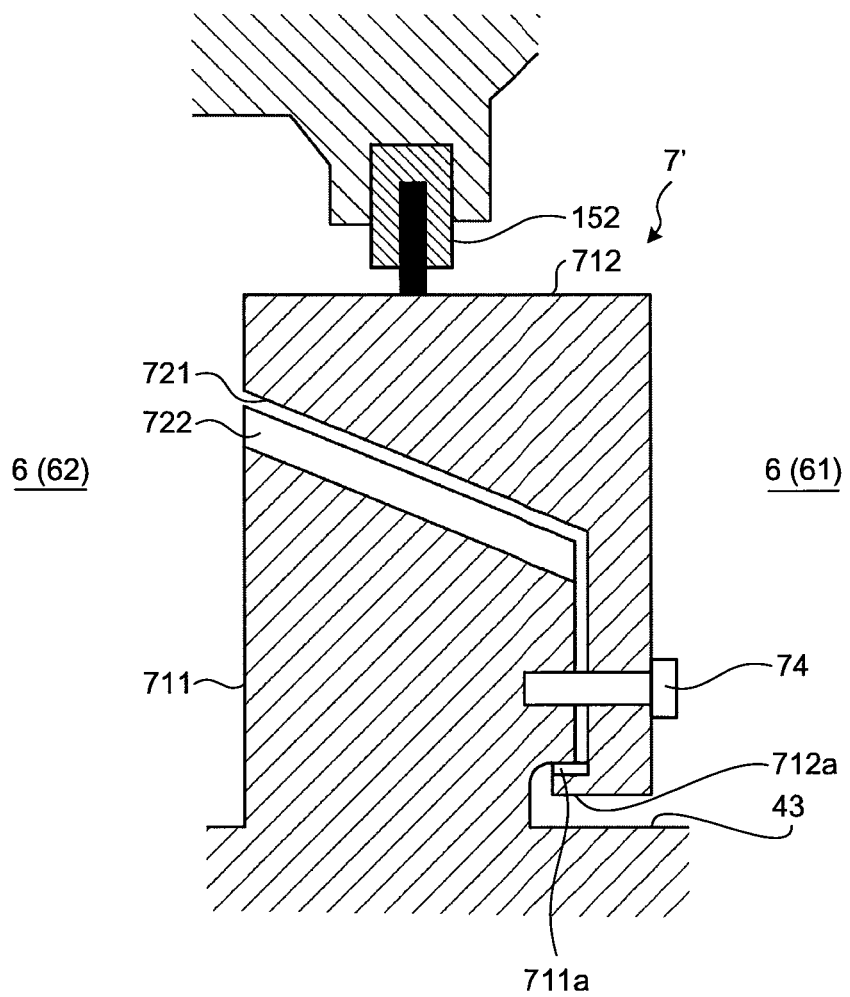

GAS TURBINE, LOAD COUPLING OF GAS TURBINE, AND COOLING METHOD OF GAS TURBINE COMPRESSOR

RELATED APPLICATIONS

The present application is a national phase of PCT/JP2009/050135, filed Jan. 8, 2009, and claims priority from, Japanese Application Number 2008-088751, filed Mar. 28, 2008, the disclosures of which are hereby incorporated by reference herein in their entirety.

TECHNICAL FIELD

The present invention relates to a gas turbine, and more particularly relates to a gas turbine that can reduce temperature of a hollow part provided in a load coupling that couples rotors of a compressor and a turbine to each other, a load coupling of a gas turbine, and a cooling method of a gas turbine compressor.

BACKGROUND ART

A gas turbine is constituted by a compressor, a combustor, and a turbine. The compressor compresses air taken in from an air inlet, thereby generating high-temperature and high-pressure compressed air. The combustor supplies fuel to the compressed air to burn the fuel, thereby generating high-temperature and high-pressure combustion gas. In the turbine, a plurality of turbine vane and a plurality of turbine rotor blades are alternatively arranged in a casing. The turbine rotor blades are driven by combustion gas supplied to an exhaust passage, thereby rotating the rotor coupled to a power generator. The combustion gas that has driven the turbine is released into the atmosphere after being converted to a static pressure by a diffuser.

In such a gas turbine, in recent years, compressors use higher pressure, and air temperature at a discharge portion at a latter stage of the compressor becomes 500° C. or more. Therefore, as a conventional gas turbine, there has been known a gas turbine in which cooled air obtained by extracting a part of compressor discharge air and cooling the air via a cooler is fed into a hollow part (a cavity) provided in a load coupling that couples rotors of a compressor and a turbine to each other at a latter stage of the compressor to cool the temperature of the hollow part (see, for example, Patent Document 1).

Patent Document 1: Japanese Patent Application Laid-open No. H11-125199

DISCLOSURE OF INVENTION

Problem to be Solved by the Invention

However, in a compressor in which the compressor rotor blades have most of its compression capability, there is little pressure change between an upstream side and a downstream side of the compressor vanes at the latter stage. As a result, because the cooled air does not flow from the hollow part in the load coupling to between the compressor rotor blades and the compressor vanes at the latter stage, the cooled air hardly flows into the hollow part, and thus the temperature in the hollow part cannot be reduced efficiently. Further, it is another cause of blocking the flow of the cooled air from the hollow part that the pressure drops in a portion leading from the hollow part of the load coupling to between the compressor rotor blades and the compressor vanes at the latter stage, due to a pressure loss in piping for feeding the cooled air.

The present invention has been achieved to solve the above problems, and an object of the present invention is to provide a gas turbine, a load coupling of a gas turbine, and a cooling method of a gas turbine compressor that can efficiently reduce temperature in a hollow part provided in the load coupling.

Means for Solving Problem

According to an aspect of the present invention, a gas turbine includes: a cooling passage leading from a latter stage of a compressor, via an external cooler, to a hollow part provided in a load coupling that couples a rotor of the compressor and a rotor of a turbine to each other, and also leading from the hollow part to the latter stage of the compressor; and a centrifugal compressor that raises air pressure in the hollow part with rotation of the load coupling, in the hollow part.

Advantageously, in the gas turbine, the centrifugal compressor includes a through hole provided in such a manner that the through hole opens radially inward on one side of a flange and opens radially outward on the other side thereof axially opposite to each other, with respect to the flange protruding from the load coupling radially outward in the hollow part, to penetrate the flange, with a radially outward opening being provided to face the latter stage of the compressor.

The gas turbine raises the air pressure in the hollow part by a centrifugal force resulting from rotation of the load coupling at the time of operating the gas turbine. In a gas turbine using a compressor in which compressor rotor blades have most of the compression capability, there is little pressure change between an upstream side and a downstream side of compressor vanes at a latter stage, and cooled air does not flow from the hollow part of the load coupling to between the compressor rotor blades and the compressor vanes at the latter stage. Therefore, the cooled air hardly flows into the hollow part, and thus the temperature in the hollow part cannot be reduced efficiently. In this regard, in the gas turbine according to the present invention, the air pressure in the hollow part is raised by the centrifugal compressor provided in the hollow part. Therefore, cooled air flows from the hollow part to between the compressor rotor blades and the compressor vanes at the latter stage, and cooled air flows to the hollow part. Accordingly, the temperature in the hollow part can be reduced efficiently.

Advantageously, in the gas turbine, a wall surface of the flange on the one side is formed in such a mode that an opening of the through hole faces a central axis of the rotor.

In the gas turbine, because a position difference in a radial direction of opening edges of the through hole decreases, the stress concentration due to a centrifugal force generated in the opening edges (particularly, a radially outward opening edge) can be reduced.

Advantageously, in the gas turbine, overlapping parts extending from opposite directions with ends thereof overlapping on each other are provided in a portion leading from the hollow part to the latter stage of the compressor.

In the gas turbine, the overlapping part works as a diaphragm to form an air curtain that once equalizes the pressure in the hollow part in which the air pressure therein has been raised. Accordingly, pulsed air injected from the through hole does not reach the compressor rotor blades and the compressor vanes, thereby enabling to prevent forced oscillation of the blades and vanes.

Advantageously, in the gas turbine, a thermal insulation member having thermal insulation properties is provided on a partition wall present between the hollow part and a compressed air passage leading from the compressor to a combustor.

In the gas turbine, radiation heat from the compressed air passage to the hollow part through the partition wall is blocked by the thermal insulation member, thereby enabling to prevent a temperature rise in the hollow part and to improve cooling efficiency of the hollow part.

According to another aspect of the present invention, a load coupling of a gas turbine includes a centrifugal compressor that includes a flange provided on a load coupling that couples a rotor of a compressor and a rotor of a turbine to each other, protruding radially outward of the load coupling, and a through hole that opens radially inward on one side of the flange and opens radially outward on the other side axially opposite to each other, to penetrate the flange, with a radially outward opening being provided to face a latter stage of the compressor. The centrifugal compressor discharges air from the radially outward opening, while taking in air from a radially inward opening with rotation of the load coupling and raising pressure of the air.

According to the load coupling of a gas turbine, a centrifugal force resulting from own rotation at the time of operating the gas turbine acts on the centrifugal compressor to raise the air pressure in the hollow part. In the gas turbine using the compressor in which compressor rotor blades have most of the compression capability, there is little pressure change between an upstream side and a downstream side of compressor vanes at the latter stage, and cooled air does not flow from the hollow part of the load coupling to between the compressor rotor blades and the compressor vanes at the latter stage. Therefore, the cooled air hardly flows into the hollow part, and thus the temperature in the hollow part cannot be reduced efficiently. In the regard, in the gas turbine according to the present invention, the air pressure in the hollow part is raised by the centrifugal compressor provided in the hollow part. Therefore, cooled air flows from the hollow part to between the compressor rotor blades and the compressor vanes at the latter stage, and then flows into the hollow part. Accordingly, the temperature in the hollow part can be reduced efficiently.

According to still another aspect of the present invention, the cooling method of a gas turbine compressor includes a step of bleeding compressed air from a latter stage of a compressor to outside of a gas turbine, a step of cooling bled compressed air by en external cooler, a step of injecting cooled compressed air to a hollow part provided in a load coupling that couples a rotor of the compressor and a rotor of a turbine to each other, and a step of centrifugally compressing injected compressed air by rotation of the load coupling to raise a pressure thereof, and supplying compressed air from the hollow part to a cooling passage leading to a latter stage of the compressor.

According to the cooling method of a gas turbine compressor, the compressed air injected to the hollow part provided in the load coupling that couples the rotor of the compressor and the rotor of the turbine to each other is centrifugally compressed by the rotation of the load coupling to raise the pressure thereof, and supplied to the cooling passage leading to the latter stage of the compressor. Therefore, the compressed air flows from the hollow part to between the compressor rotor blades and the compressor vanes at the latter stage, and then flows into the hollow part, thereby enabling to efficiently reduce the temperature in the hollow part.

Effect of the Invention

According to the present invention, temperature in a hollow part provided in a load coupling can be efficiently reduced.

BRIEF DESCRIPTION OF DRAWINGS

FIG. 2 is a schematic configuration diagram of a cooling passage in the gas turbine shown in FIG. 1, wherein FIG. 2 corresponds to an area A surrounded by dotted lines in FIG. 1.

FIG. 3 is a schematic configuration diagram of a centrifugal compressor having another configuration, wherein FIG. 3 corresponds to an area B surrounded by dotted lines in FIG. 2.

Figure 1:
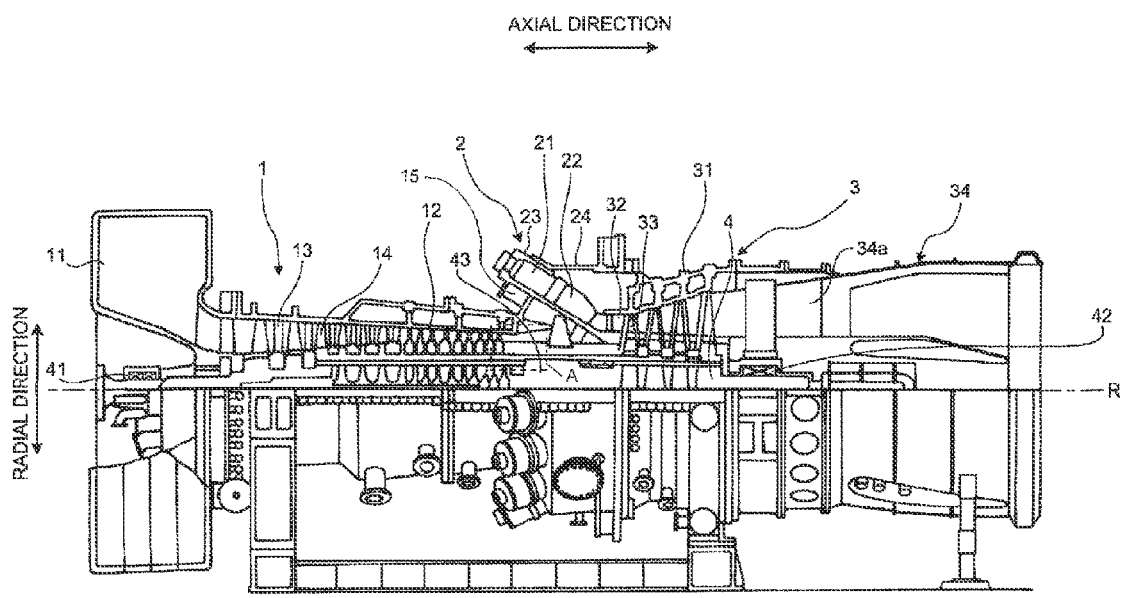
FIG. 1 is a schematic configuration diagram of a gas turbine according to an embodiment of the present invention.

EXPLANATIONS OF LETTERS OR NUMERALS 1 compressor
11 air inlet
12 compressor casing
13 compressor vane
131 compressor vane at latter stage
14 compressor rotor blade
141 compressor rotor blade at latter stage
15 compressed air passage
151 partition wall
2 combustor
3 turbine
4 rotor
41 bearing
42 bearing
43 load coupling
5 external cooler
6 hollow part
61 rear-side hollow part
62 front-side hollow part
7, 7' centrifugal compressor
71 flange
711 flange
711a edge
712 outer periphery
712a hook
72 through hole
721 through hole
722 shroud
73 depression
74 bolt
8 overlapping part
9 thermal insulation member
R central axis

BEST MODE(S) FOR CARRYING OUT THE INVENTION

Exemplary embodiments of a gas turbine, a load coupling of a gas turbine, and a cooling method of a gas turbine compressor according to the present invention will be explained below in detail with reference to the accompanying drawings. The present invention is not limited to the embodiments.

FIG. 1 is a schematic configuration diagram of a gas turbine according to an embodiment of the present invention, and FIG. 2 is a schematic configuration diagram of a cooling passage in the gas turbine shown in FIG. 1.

As shown in FIG. 1, the gas turbine includes a compressor 1, a combustor 2, and a turbine 3. A rotor 4 is arranged, penetrating through the central part of the compressor 1, the combustor 2, and the turbine 3. The compressor 1, the combustor 2, and the turbine 3 are arranged in parallel along a central axis R of the rotor 4 in order from an upstream side (a front side) toward a downstream side (a rear side) of a flow of air or combustion gas. In the explanations below, an axial direction refers to a direction parallel to the central axis R, a circumferential direction refers to a circumferential direction about the central axis R, and a radial direction refers to a direction orthogonal to the central axis R. Further, radially outward refers to a direction away from the central axis R, and radially inward refers to a direction approaching the central axis R.

The compressor 1 compresses air to generate compressed air. The compressor 1 includes a compressor vane 13 and a compressor rotor blade 14 in a compressor casing 12 having an air inlet 11 for taking air in. Plural compressor vanes 13 are attached to the compressor casing 12 and arranged in parallel in the circumferential direction. Plural compressor rotor blades 14 are attached to a compressor disk and arranged in parallel in the circumferential direction. These compressor vanes 13 and the compressor rotor blades 14 are alternatively provided along the axial direction.

The combustor 2 supplies fuel to the compressed air compressed by the compressor 1 to generate high-temperature and high-pressure combustion gas. The combustor 2 includes an combustor basket 21 that mixes and burns the compressed air and fuel as a combustion liner, a transition piece 22 that leads combustion gas from the combustor basket 21 to the turbine 3, and an external cylinder 23 that covers an outer circumference of the combustor basket 21 and leads compressed air from the compressor 1 to the combustor basket 21. Plural (for example, 16) combustors 2 are arranged in parallel in the circumferential direction with respect to a combustor casing 24.

The turbine 3 generates rotative power by the combustion gas burned in the combustor 2. The turbine 3 includes a turbine vane 32 and a turbine rotor blade 33 in a turbine casing 31. Plural turbine vane 32 are attached to the turbine casing 31 and arranged in parallel in the circumferential direction. Plural turbine rotor blades 33 are fixed to the outer circumference of a disk centering on the central axis R of the rotor 4 and arranged in parallel in the circumferential direction. These turbine vane 32 and the turbine rotor blades 33 are alternatively provided along the axial direction. An exhaust chamber 34 including an exhaust diffuser 34a continuous to the turbine 3 is provided on a rear side of the turbine casing 31.

The rotor 4 is rotatably provided about the central axis R, with one end thereof on the compressor 1 side being supported by a bearing 41, and an end thereof on the exhaust chamber 34 side being supported by a bearing 42. A drive shaft of a power generator (not shown) is coupled to the end of the rotor 4 on the exhaust chamber 34 side.

In such a gas turbine, air taken in from the air inlet 11 of the compressor 1 passes through the compressor vanes 13 and the compressor rotor blades 14 and is compressed, to become high-temperature and high-pressure compressed air. Fuel is supplied to the compressed air from the combustor 2 to generate high-temperature and high-pressure combustion gas. The combustion gas passes through the turbine vane 32 and the turbine rotor blades 33 of the turbine 3 to rotate the rotor 4, and the rotative power is provided to the power generator coupled to the rotor 4 to generate power. Flue gas after rotating the rotor 4 is converted to a static pressure by the exhaust diffuser 34a in the exhaust chamber 34, and is released into the atmosphere.

In the gas turbine having such a configuration, when a high-pressure compressor 1 is used, air temperature at a discharge portion at the latter stage of the compressor 1 becomes as high as 500° C. In the gas turbine, as shown in FIG. 2, such a configuration is adopted that the compressed air is bled from a compressed air passage 15, which is on the rear side of the compressor 1 and connected to the combustor 2, and the compressed air is injected again via an external cooler 5 provided outside of the gas turbine to a hollow part (a cavity) 6 provided in a load coupling 43 that couples the rotor 4 of the compressor 1 and the rotor 4 of the turbine 3 to each other. The cooled compressed air is supplied from the hollow part 6 to the cooling passage leading to the latter stage of the compressor 1.

The hollow part 6 is provided with a centrifugal compressor 7. The centrifugal compressor 7 has a flange 71 protruding radially outward from the load coupling 43 in the hollow part 6, and includes a plurality of through holes 72 penetrating the flange 71.

The flange 71 protrudes radially outward of the load coupling 43, and is formed continuously in the circumferential direction. A tight seal (for example, a brush seal) 152 provided on a partition wall 151 is put between a wall surface radially outward of the flange 71 and the partition wall 151 between the compressed air passage 15 and the hollow part 6. Therefore, the hollow part 6 is divided into a rear-side hollow part 61 and a front-side hollow part 62.

The through hole 72 opens on respective wall surfaces of the flange 71 axially opposite to each other. Specifically, the through hole 72 opens radially inward on one side of the flange 71 facing the rear-side hollow part 61, and on the other side of the flange 71 facing the front-side hollow part 62, opens radially outward and toward the latter stage side of the compressor 1, so that the through hole 72 penetrates in a radial direction of the central axis R. The latter stage side of the compressor 1 represents a part leading from the front-side hollow part 62 to the latter stage of the compressor 1.

In the centrifugal compressor 7, because there is a position difference in a radial direction of the opening, the air pressure in the rear-side hollow part 61 is raised as reaching the front-side hollow part 62, due to a centrifugal force resulting from the rotation of the load coupling 43 at the time of operating the gas turbine.

Specifically, a cooling method of the gas turbine compressor includes a step of bleeding compressed air from the latter stage of the compressor 1 to outside of the gas turbine, a step of cooling bled compressed air by the external cooler 5, a step of injecting cooled compressed air to the rear-side hollow part 61 provided in the load coupling 43 that couples the rotor 4 of the compressor 1 and the rotor 4 of the turbine 3 to each other, and a step of centrifugally compressing injected compressed air by the rotation of the load coupling 43 to raise the pressure thereof, and supplying the compressed air from the front-side hollow part 61 to the cooling passage leading to the latter stage of the compressor 1.

In the gas turbine that uses the compressor 1 in which the compressor rotor blades 14 have most of the compression capability, there is little pressure change between an upstream side and a downstream side of compressor vanes 131 at the latter stage. As a result, cooled air does not flow from the hollow part 6 in the load coupling 43 to between compressor rotor blades 141 and the compressor vanes 131 at the latter stage. Therefore, the cooled air hardly flows into the hollow part 6, and thus the temperature in the hollow part 6 cannot be reduced efficiently. Further, it is another cause of blocking the flow of the cooled air from the hollow part 6 that the pressure drops in a portion leading from the hollow part 6 of the load coupling 43 to between the compressor rotor blades 141 and the compressor vanes 131 at the latter stage due to a pressure loss in piping of the cooling passage for feeding cooled air.

In this regard, in the gas turbine, the load coupling of a gas turbine, and the cooling method of a gas turbine compressor according to the present embodiment, because the centrifugal compressor 7 provided in the hollow part 6 raises the air pressure in the rear-side hollow part 61 as reaching the front-side hollow part 62, cooled air flows from the front-side hollow part 62 to between the compressor rotor blades 141 and the compressor vanes 131 at the latter stage, and then flows into the hollow part 6, thereby enabling to efficiently reduce the temperature in the hollow part 6.

Further, even when a compressor in which the compressor vanes 13 and the compressor rotor blades 14 respectively have the equal compression capability is used instead of the compressor 1 in which the compressor rotor blades 14 have most of the compression capability, the centrifugal compressor 7 compensates the pressure loss in the piping of the cooling passage for feeding the cooled air. Therefore, cooled air is caused to flow from the front-side hollow part 62 to between the compressor rotor blades 141 and the compressor vanes 131 at the latter stage, and then into the hollow part 6, thereby enabling to efficiently reduce the temperature in the hollow part 6.

It is desired that the axial position of the flange 71 approaches a portion leading from the hollow part 6 to between the compressor rotor blades 141 and the compressor vanes 131 at the latter stage so that the front-side hollow part 62 is formed narrow. That is, if the front-side hollow part 62 is too wide, unpredictable flow of air is generated and it becomes difficult to determine the cooling efficiency. However, if the front-side hollow part 62 is formed narrow, the flow of air can be predicted, and thus the cooling efficiency can be easily determined.

In the gas turbine and the load coupling of a gas turbine according to the present embodiment, the one wall surface of the flange 71 is formed such that the opening of the through hole 72 faces the central axis R of the rotor 4. That is, the wall surface of the flange 71 on which the through hole 72 opens radially inward and faces the rear-side hollow part 61 is formed such that the opening faces radially inward. Specifically, a depression 73 is formed on the wall surface of the flange 71 facing the rear-side hollow part 61. The through hole 72 is opened on the surface facing radially inward by the depression 73.

According to such a configuration, because a position difference h of an opening edge of the through hole 72 decreases in a radial direction, the stress concentration due to the centrifugal force generated in the opening edge (particularly, a radially outward opening edge) can be reduced. If the depression 73 is formed on the axially opposite wall surfaces of the flange 71, the centrifugal force can have a good balance.

In the gas turbine and the load coupling of a gas turbine according to the present embodiment, at least two pairs of overlapping parts 8 extending from opposite directions of a disk 141A and the partition wall 151, with ends thereof overlapping on each other, are provided in a portion leading from the hollow part 6 to between the compressor rotor blades 141 and the compressor vanes 131 at the latter stage and between the disk 141A on which the compressor rotor blade 141 at the latter stage is fixed and the partition wall 151 axially opposite to each other.

When there is no overlapping part 8 in the portion leading from the hollow part 6 to between the compressor rotor blades 141 and the compressor vanes 131 at the latter stage, air is injected in pulses from the rotating through holes 72 in the centrifugal compressor 7 and air flows from the front-side hollow part 62 directly toward the compressor 1, to cause forced oscillation of the compressor rotor blades 14 and the compressor vanes 13, which is not desired. In this regard, when the overlapping part 8 is provided, it works as a diaphragm to form an air curtain that once equalizes the pressure in the front-side hollow part 62. Accordingly, pulsed air does not reach the compressor rotor blades 14 and the compressor vanes 13, thereby enabling to prevent forced oscillation thereof.

Further, in the gas turbine and the load coupling of a gas turbine according to the present embodiment, a thermal insulation member 9 having thermal insulation properties is provided on the partition wall 151 present between the compressed air passage 15 and the hollow part 6. Specifically, the plate-like thermal insulation member 9 is provided on the hollow part 6 side of the partition wall 151.

According to such a configuration, because radiation heat from the compressed air passage 15 to the hollow part 6 via the partition wall 151 is blocked by the thermal insulation member 9, a temperature rise in the hollow part 6 can be prevented, and cooling efficiency of the hollow part 6 can be improved.

FIG. 3 is a schematic configuration diagram of a centrifugal compressor having another configuration. In a centrifugal compressor 7' shown in FIG. 3, an outer periphery 712 is fixed to an outer circumference of a flange 711 protruding from the load coupling 43 by a bolt 74, and a through hole 721 is provided therebetween. In this case, to avoid a stress due to the centrifugal force, it is desired that a hook 712a provided on the outer periphery 712 is engaged with an edge 711a provided on the flange 711 in a radial direction.

According to such a configuration, to fix the outer periphery 712 to the outer circumference of the flange 711, not only the through hole 721, which becomes a pressure riser, penetrates in a radiation direction of the central axis R, but also various modes can be made. For example, as shown in FIG. 3, a shroud 722 can be formed on an outer peripheral edge of the flange 711, which is covered with the outer periphery 712. This configuration can improve pressure rising performance. Although not shown in the drawings, the through hole 721 having a diagonal or curved shape with respect to the radiation direction of the central axis R can be also obtained.

INDUSTRIAL APPLICABILITY

As described above, the gas turbine, the load coupling of a gas turbine, and the cooling method of a gas turbine compressor according to the present invention are suitable for reducing temperature in a hollow part provided in a load coupling that couples rotors of a compressor and a turbine to each other.

The invention claimed is:

1. A gas turbine, comprising:
a load coupling for coupling a rotor of a compressor and a rotor of the turbine to each other, and extending parallel to a central axis of the rotor;
a centrifugal compressor configured by:
a flange protruding from and orthogonal to the load coupling and away from the central axis into a hollow part so as to divide the hollow part into a rear-side hollow part and a front-side hollow part, the hollow part being defined by the load coupling, a partition wall of the compressor and a disk on which a compressor rotor blade at a latter stage of the compressor is fixed; and
a through hole communicating between the rear-side hollow part and the front-side hollow part, the through hole being provided in the flange, and air pressure in the rear-side hollow part being raised via the through hole with rotation of the load coupling; and a cooling passage leading from the latter stage of the compressor, via an outside of the compressor, to the rear-side hollow part, and also leading from the rear-side hollow part, via the through hole, to the latter stage of the compressor.

2. The gas turbine according to claim 1, wherein the through hole is provided to open radially inward on a first side of the flange and radially outward on a second side of the flange, the first and second sides axially opposite to each other.

3. The gas turbine according to claim 2, wherein a wall surface of the flange on the one side is formed in such a mode that an opening of the through hole faces the central axis of the rotor.

4. The gas turbine according to claim 1, wherein overlapping parts extending from opposite directions with ends thereof overlapping on each other are provided in a portion leading from the hollow part to the latter stage of the compressor.

5. The gas turbine according to claim 1, wherein a thermal insulation member having thermal insulation properties is provided on the partition wall present between the hollow part and a compressed air passage leading from the compressor to a combustor.

6. A cooling method of a gas turbine compressor, comprising:

bleeding compressed air from a latter stage of a compressor to outside of a gas turbine;

injecting cooled compressed air to a hollow part provided in a load coupling that couples a rotor of the compressor and a rotor of a turbine to each other, wherein the load coupling extends parallel to a central axis of the rotor; and centrifugally compressing injected compressed air by rotation of the load coupling to raise a pressure thereof and by using a centrifugal compressor that includes:

a flange protruding from and orthogonal to the load coupling and away from the central axis into the hollow part so as to divide the hollow part into a rear-side hollow part and a front-side hollow part, the hollow part being defined by the load coupling, a partition wall of the compressor and a disk on which a compressor rotor blade at the latter stage is fixed, and a through hole communicating between the rear-side hollow part and the front-side hollow part, the through hole being provided in the flange, and supplying compressed air from the hollow part to a cooling passage leading to the latter stage of the compressor, wherein air pressure in the rear-side hollow part is raised via the through hole with rotation of the load coupling, and the cooling passage leads from the latter stage of the compressor, via an outside of the compressor, to the rear-side hollow part, and also leads from the rear-side hollow part, via the through hole, to the latter stage of the compressor.

* * * * *